(12) United States Patent
Arndt

(10) Patent No.: US 6,910,378 B2
(45) Date of Patent: Jun. 28, 2005

(54) METHOD FOR DETERMINING A LEVEL, AND LEVEL MEASURING DEVICE

(75) Inventor: Michael Arndt, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 10/367,912

(22) Filed: Feb. 19, 2003

(65) Prior Publication Data

US 2003/0213299 A1 Nov. 20, 2003

(30) Foreign Application Priority Data

Feb. 21, 2002 (DE) .......................................... 102 07 278

(51) Int. Cl.⁷ .......................................... G01F 23/284
(52) U.S. Cl. .................. 73/290 V; 73/290 R
(58) Field of Search ........................ 73/290 R, 290 V

(56) References Cited

U.S. PATENT DOCUMENTS 3,874,236 A * 4/1975 Reck ...................... 73/290 V
4,107,994 A * 8/1978 Sogo ...................... 73/290 V

* cited by examiner

Primary Examiner—Hezron Williams
Assistant Examiner—Rodney Frank
(74) Attorney, Agent, or Firm—Ronald E. Greigg

(57) ABSTRACT

A method of determining the level of a medium in a container by generating a constant magnetic field in the container, exciting an elongated sensor element to longitudinal oscillations, the sensor element being secured on one end in the container and containing a magnetostrictive material, measuring the resonant frequency of the sensor element, or the damping of the longitudinal oscillation, by means of periodically varying magnetization of the sensor element in the constant magnetic field, and determining the fill level from the resonant frequency or from the damping of the longitudinal oscillations.

17 Claims, 3 Drawing Sheets

METHOD FOR DETERMINING A LEVEL, AND LEVEL MEASURING DEVICE

BACKGROUND OF THE INVENTION

1. Field of the Invention

This invention relates to an improved level measuring device used to monitor the level of a substance in a container, for example to such a device which may be used to measure the level of fuel in the fuel tank or the level of brake fluid or coolant in motor vehicles.

2. Description of the Prior Art

For many years, level measuring devices for tanks have been known in which the buoyant body of a rotatably supported float assembly floats on the liquid in the tank. The angular position of the float, which depends on the level of the liquid, is transmitted for instance to a magnet, whose angular position is then a measure of the fill level. Such level measuring devices with float levers are known for instance from German Patent Disclosure DE-A 28 30 518 or German Patent Disclosure DE-A 199 25 185.

Other fill level sensors in the prior art are based on the use of feeler plates, changes in capacitance or resistance, thermal, radiometric, optical or acoustical measurements, radar measurements, force or pressure measurements, or measurements with a vibrating piezoelectric pickup.

One disadvantage of the sensors in the prior art is that between the sensor element and evaluating electronics there must usually be an electrical, mechanical or optical connection. This requires increased engineering effort and expense, for example, and the connection can become soiled by the substance, and/or the container can be made to leak because of the connection.

If an electrical, mechanical or optical connection is not required, then in the prior art at least the sensor element must be supplied from an energy source (such as a battery), which has to be changed after some time. This is especially disadvantageous in applications where access to the sensor element is difficult.

OBJECT AND SUMMARY OF THE INVENTION

One advantage of the present invention is that an alternative method and an alternative device for continuous level determination are made available, and neither an electrical, mechanical or optical connection between the sensor element and the evaluating electronics nor an energy source directly at the sensor element is needed. This makes it possible to measure the level of a medium in a closed tank or container. The sensor element need not be accessible from outside the closed container. The fill level signal is transmitted through the wall of the container, and the sensor element is supplied with energy from outside the container during the measurement.

These advantages are attained according to the invention by a method for determining the level of a medium in a container, having the following method steps:

A) generating a constant magnetic field in the container;

B) exciting a sensor element, secured on one end in the container and containing a magnetostrictive material, to longitudinal oscillations;

C) measuring the resonant frequency of the sensor element, or the damping of the longitudinal oscillation, by means of the periodically varying magnetization of the sensor element in the constant magnetic field; and D) determining the level from the resonant frequency or from the damping of the longitudinal oscillations.

Magnetostriction is a property that is found in ferromagnetic materials, such as iron, nickel, cobalt, and alloys of them. If ferromagnetic materials are placed within range of a magnetic field, a microscopic deformation of their molecular structure occurs, which causes a change in their dimensions. For instance, if a rod of ferromagnetic material is placed in a magnetic field that extends parallel to the longitudinal direction of the rod, then this rod undergoes a mechanical change in length. The relative change in length $\Delta L/L$, which can be attained by a magnetostrictive effect, known as the Joule effect, is generally on the order of magnitude of $10^{-5}$. In highly magnetostrictive materials, such as rare-earth and iron alloys, however, values up to $10^{-3}$ can be achieved. Magnetostrictive material is moreover magnetoelastic. As a magnetoelastic effect, the Villary effect is employed in some measuring methods. It involves the changes in the longitudinal magnetic properties, such as the permeability of a ferromagnetic rod, that are caused by its mechanical deformation in the longitudinal direction.

The method of the invention utilizes the magnetoelastic effect in step C) and optionally the magnetostrictive effect in step B). It is used to determine the level of a medium in a container. The medium may be a liquid or a fine-grained bulk material. Upon passivation of the sensor element (for instance coating), examples of the medium whose level can be determined by means of the present invention are water, aqueous solutions, oils, fuels, alcohols, solvents, dusts, and sands. The container is for example a tank in a motor vehicle, or a reactor in a chemical process. In the method of the invention, a sensor element secured by one end in the container and containing a magnetostrictive material is excited (B) to longitudinal oscillations at its resonant frequency. The sensor element is for instance a strip or a rod. It has a characteristic mechanical resonant frequency, which is dependent on its length, on the presence and position of a fastening point, on material parameters of the magnetostrictive material, and on the strength and direction of a surrounding magnetic field. The longitudinal oscillations of the sensor element cause a periodically varying mechanical stress, which because of the Villary effect leads to a periodic change in the longitudinal magnetic properties of the sensor element. The sensor element is located in a static magnetic field $H_B$ of lesser strength (preferably, $H_B<1$ kA/m) (step A), so that a change in magnetization of the sensor element can be detected at some distance from it. If the sensor element in a medium contained in the container is located perpendicular to the surface of the medium, then the length of the sensor element that is relevant for the oscillation is dependent on the position of the surface along the sensor element. This position is defined by the fill level in the container. Thus both the resonant frequency and the damping of the oscillation of the sensor element are affected by the fill level. In step C) of the method of the invention, the measurement of the resonant frequency and/or of the damping of the longitudinal oscillations is effected by means of the periodically varying magnetization of the sensor element in the constant magnetic field. The oscillation of the magnetic field surrounding the sensor element and generated by it likewise takes place at the resonant frequency of the sensor element and has the same damping. Consequently, both variables can be measured indirectly from outside the container (step C), and from that the fill level can be determined (step D).

In a preferred embodiment of the present invention, the excitation of the sensor element to longitudinal oscillations is effected by an alternating magnetic field (which may possibly be frequency-modulated). In a further embodiment, the excitation is effected by means of a magnetic field pulse. Both embodiments make use of the magnetostrictive effect. It is advantageous in this respect that the excitation of the sensor element to mechanical longitudinal oscillations can be done from outside the closed container.

The subject of the present invention is also a level measuring device for a container that can be filled with a medium, the level measuring device including a sensor element, which contains a magnetostrictive material; at least one magnet for generating a constant magnetic field; at least one magnet for generating a variable magnetic field; and at least one measuring device for measuring characteristic variables of a periodically varying magnetic field.

The at least one magnet for generating a variable magnetic field can for instance generate an alternating magnetic field or a magnetic field pulse, so that by means of this variable magnetic field, the sensor element can be excited to oscillations at a resonant frequency. The characteristic variables, measured with the measuring device, of a periodically varying magnetic field are for instance the frequency or damping, which are equivalent to the resonant frequency and the damping of the mechanical oscillations of the sensor element. The sensor element is located in the magnetic field that is generated by the at least one magnet for generating a constant magnetic field. With the level measuring device of the invention, the fill level of a medium in a container can be determined by the method of the invention.

In a preferred embodiment of the present invention, the magnetostrictive material, which contains the sensor element, is an iron-, cobalt-, or nickel-rich amorphous metal alloy. Preferred materials with very good magnetoelastic properties are, for example, Vitrovac® produced by Vacuumschmelze in Hanau, Germany, or Metglas® produced by Honeywell Electronic Materials in Sunnyvale, Calif., USA. The composition of Metglas® is for instance 82.17% Co, 8.6% Si, 4.45% Fe, 3.15% B, and 1.63% Ni. Vitrovac®, for instance with the composition $Fe_{62}Ni_{20}Si_2B_{16}$, is suitable as material for the present invention. Other amorphous metals suitable for the present invention for instance have the composition $T_{70-85}M_{30-15}$, where T stands for one or more of the elements Fe, Co, and Ni, and M stands for one or more of the elements B, C, and Si.

The subject of the invention is also the use of a level measuring device according to the invention for determining the level of a liquid in a container in a motor vehicle. In motor vehicles, it is advantageous for the fill level in various containers to be known, such as the fuel level in the fuel tank, or the level in coolant or brake fluid containers. However, the method and the level measuring device of the invention are suitable for determining the level in arbitrary containers.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
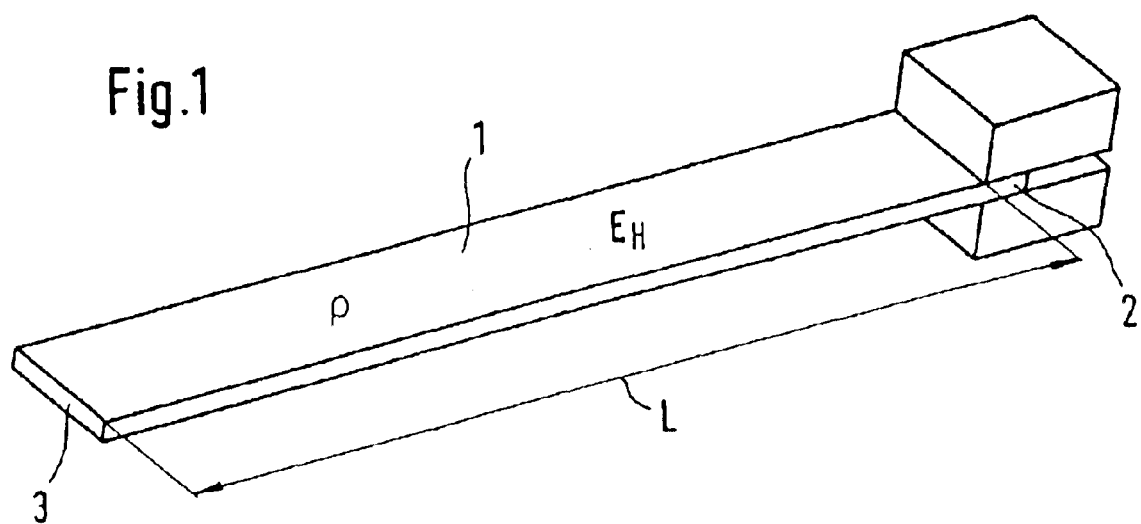
FIG. 1 shows a strip, fastened on one end, that can be excited to mechanical oscillations.

FIG. 1 shows a fastened strip, for instance a strip of a magnetostrictive material, that can be excited to mechanical oscillations. The magnetostrictive strip 1 is fastened on one end 2 and can oscillate freely on the other end 3. It has a length L, a mechanical modulus of elasticity $E_H$ (as a function of the surrounding magnetic field), and a density ρ. For the resonant frequency $f_r$ of a strip 1 fastened on one end, the following equation applies:

$$f_r = \frac{1}{4L}\sqrt{\frac{E_H}{\rho}}$$

Because of its magnetoelastic properties, the amorphous metal strip 1 can be excited, with the aid of an alternating magnetic field or a magnetic pulse, to mechanical longitudinal oscillations with this resonant frequency $f_r$ characteristic for it.

Figure 2:
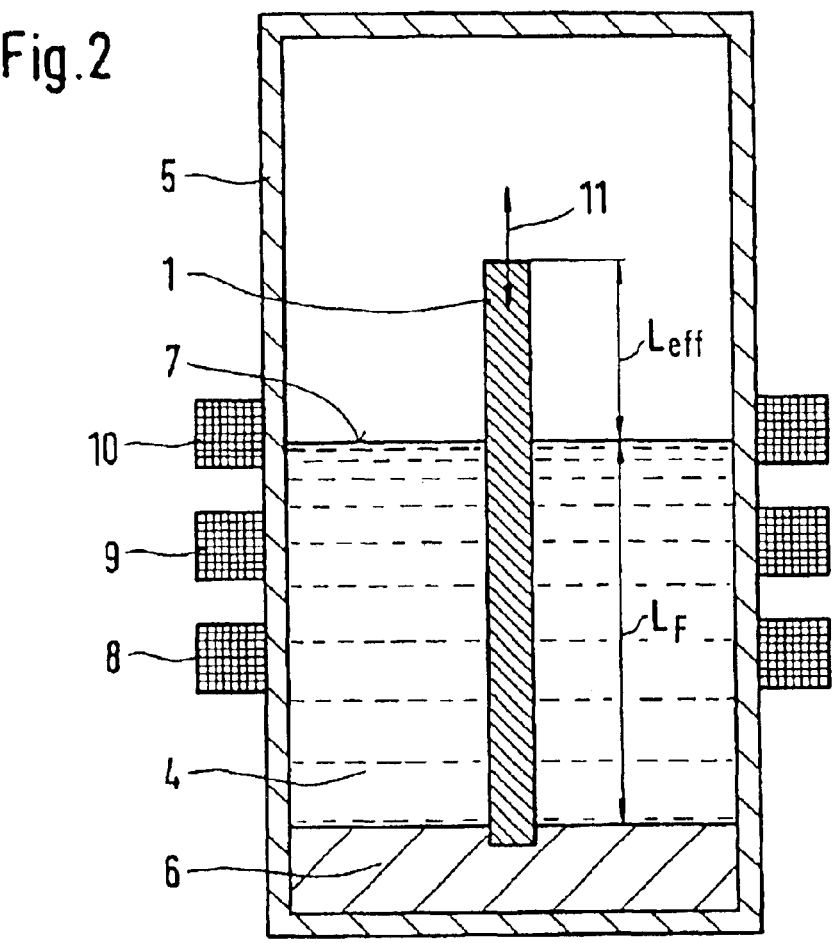
FIG. 2 shows a level measuring device of the invention.

FIG. 2 shows a level measuring device of the invention. It serves to measure the level of a medium 4 in closed container 5. To that end, a magnetostrictive strip 1 is fastened by one end in a fastening 6, so that it is oriented perpendicular to the surface 7 of the medium 4. However, versions of the present invention are also possible in which the magnetostrictive strip or rod extends obliquely through the medium and consequently also protrudes obliquely above the surface of the medium. In FIG. 2, however, it extends perpendicularly and has a total length L, which can be subdivided into two partial lengths $L_F$ and $L_{eff}$. $L_F$ is the length of the magnetostrictive strip 1 that is surrounded by the medium 4 and is consequently located below the surface 7 of the medium (that is, below the level of the substance), and $L_{eff}$ is the length of the strip 1 that protrudes above the surface 7 (that is, the length relevant to the oscillation). In the embodiment of the present invention shown in FIG. 2, the fastening 6 is located at the lower end of the container 5. However, it can also be located at some other place in the container, such as at the upper end, in which case the magnetostrictive strip 1 protrudes from above into the medium 4.

Three coils 8, 9, 10 are mounted on the outside of the container 5. A bias coil 8 serves to generate a constant weak magnetic field. With the aid of the excitation coil 9, a magnetic field is generated that serves to excite the magnetostrictive strip 1 in the direction of oscillation 11 shown. The measurement coil 10 serves to detect the signal from which the fill level $L_F$ is determined.

In this preferred embodiment of the present invention, the magnets and the measuring device are embodied as coils 8, 9, 10. The coils may be Helmholtz coils or individual coil rings. The at least one magnet for generating the constant magnetic field need not be embodied as a coil; instead, it may be a permanent magnet.

The resonant frequency of the magnetostrictive strip 1 and the damping of its oscillation correspond to the frequency and damping of the signal measured with the measurement coil 10. The resonant frequency of the magnetostrictive strip 1 depends on the level in the container 5 as follows:

$$f_r = \frac{1}{4L_{\mathit{eff}}}\sqrt{\frac{E_H}{\rho}} = \frac{1}{4(L-L_F)}\sqrt{\frac{E_H}{\rho}}$$

At a certain fill level, the resonant frequency $f_{r,1}$ relative to the resonant frequency without any medium $f_{r,0}$ ($L_F$=0) is as follows:

$$\frac{f_{r,1}}{f_{r,0}} = \frac{L}{(L-L_F)}$$

Thus the fill level at the time can be determined from the current resonant frequency as follows:

$$L_F = L\left(1 - \frac{f_{r,0}}{f_{r,1}}\right)$$

For the damping of the magnetostrictive strip 1, a similar calculation can be performed. The damping depends on the viscosity of the medium, on the one hand, and on the other, on the depth of immersion, with the damping increasing as the immersion depth of the strip in the medium increases.

Figure 3:
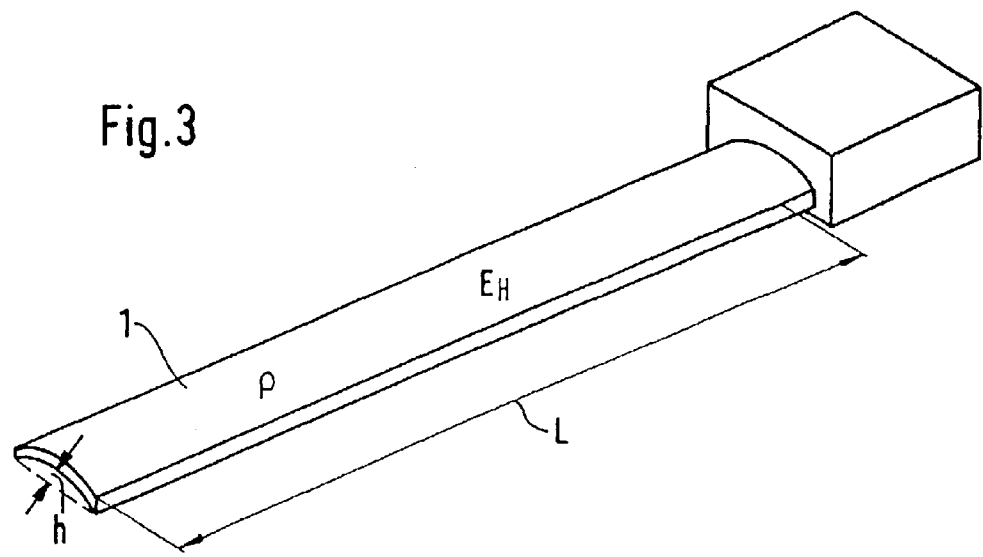
FIG. 3 shows a curved strip, fastened on one end.

FIG. 3 shows a curved magnetostrictive strip 1 fastened on one end and having the length L, a modulus of elasticity $E_H$, and a density $\rho$, with the curvature being in its transverse direction. Preferably, the curvature height h is from 0.1 mm to 5 mm. In a further embodiment (not shown) of the present invention, the strip is curved into a tube. The function of the curvature is to increase the mechanical stability of the magnetostrictive strip 1, which must for example withstand the filling up of the container with the medium, in particular with bulk material.

Figure 4:
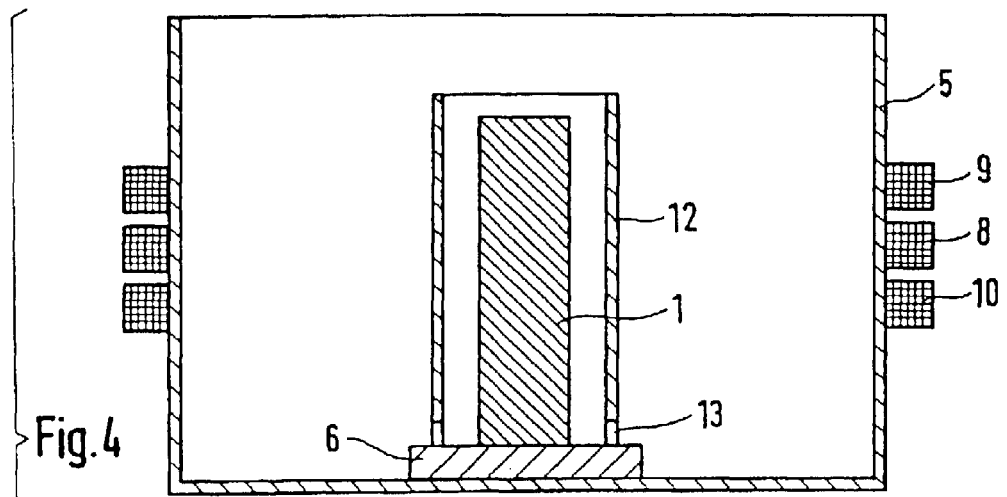
FIG. 4 shows a plan view and section through a level measuring device of the invention.
Figure 4:
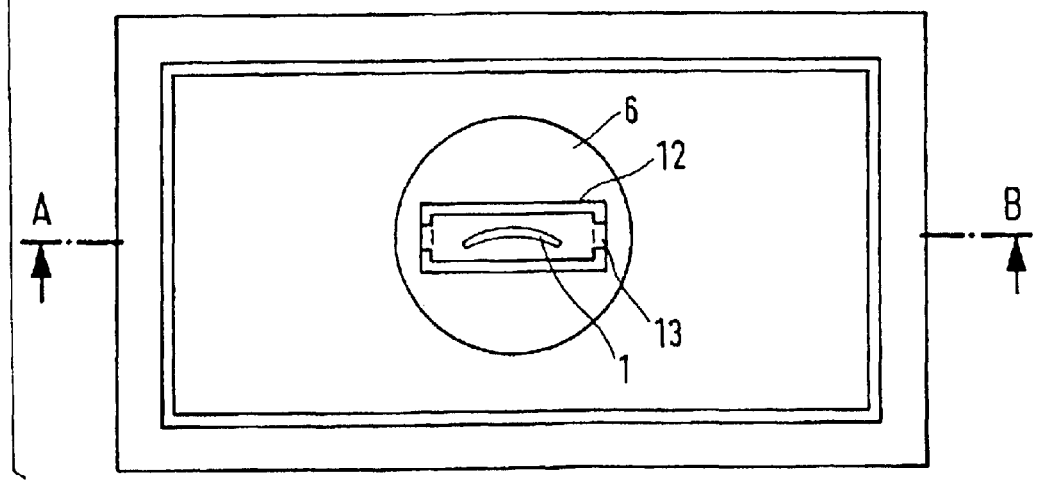

In FIG. 4, a plan view and a section through a level measuring device of the invention with a curved magnetostrictive strip are shown. In the upper part of FIG. 4, a section through a level measuring device of the invention is shown that extends along the line A–B of the plan view in the lower part of FIG. 4. The construction of the level measuring device may be largely equivalent to that shown in FIG. 2. In FIG. 4, a rectangular container 5 is shown, with a magnetostrictive strip 1 secured centrally by means of the fastening 6 and with three coils 8, 9, 10 mounted on the outside. Also located in the container is a protective tube 12, which surrounds the magnetostrictive strip 1. The protective tube 12 prevents the magnetostrictive strip 1 from kinking in response to flows of the medium 4 (not shown in FIG. 4) in the container 5. The strip 1 is given additional stability because of its curvature, which can be seen in the plan view shown below in FIG. 4. To assure that the fill level of the medium 4 in the protective tube 12 is equivalent to the fill level in the entire container 5, the protective tube 12 has openings 13 on its lower end, which permit easy entry of the medium into and outflow of it from the protective tube 12. Thus a constant equalization of the fill level between the protective tube 12 and the container 5 surrounding it is assured.

In the preferred embodiment of the present invention shown in FIG. 4, the generation of the constant magnetic field is done by means of a bias coil 8. Alternatively, the at least one magnet for generating the constant magnetic field can be embodied as a permanent-magnetic strip secured to the protective tube 12.

Figure 5:
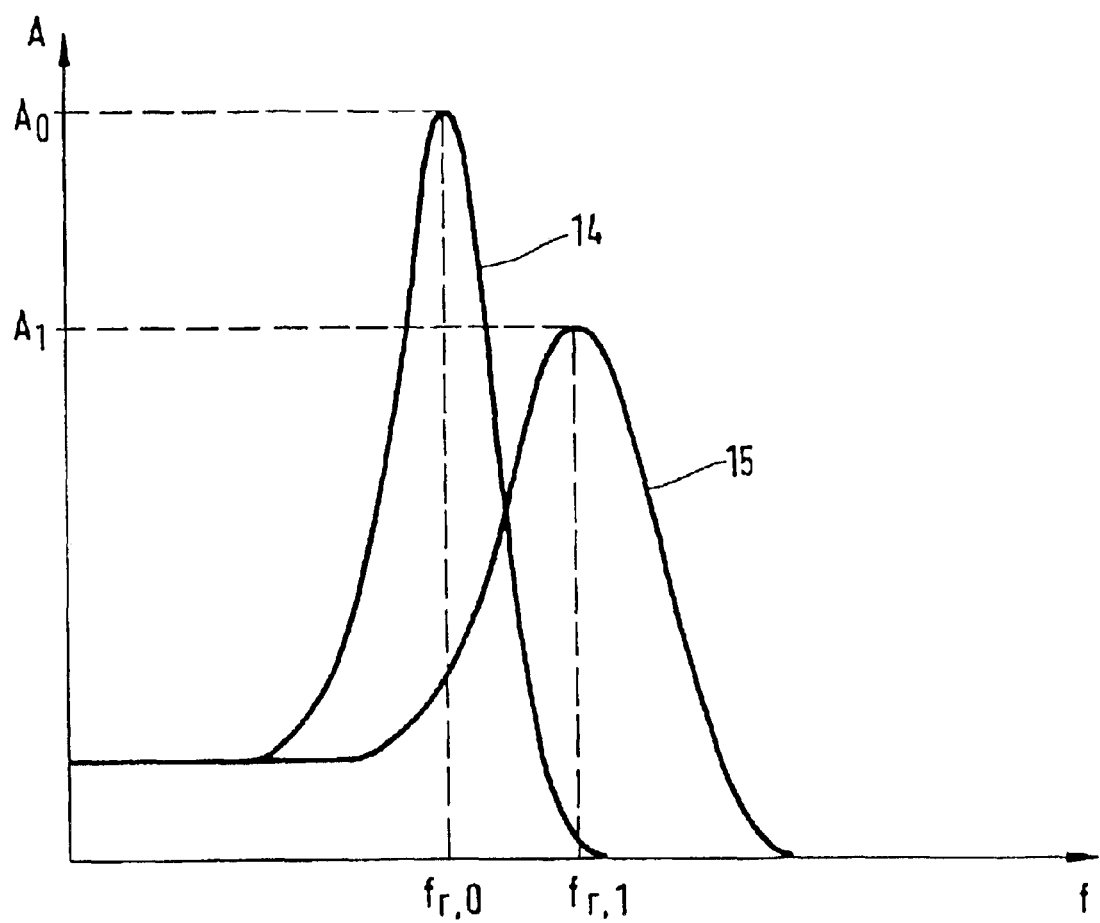
FIG. 5 is a graph showing the oscillation behavior of a strip.

FIG. 5 shows a graph illustrating the oscillation behavior of a magnetostrictive strip. The amplitude A of the oscillating strip is plotted on the Y axis, and the frequency of the exciting magnetic field is plotted on the X axis. The two resonance curves 14, 15 illustrate the oscillation behavior of the magnetostrictive strip upon continuous excitation with a frequency-wobbled magnetic field, for two different fill levels in one container. The amplitude becomes maximal when the exciting magnetic field reaches the resonant frequency of the strip. The first resonance curve 14 has a maximum amplitude $A_0$ at the resonant frequency $f_{r,0}$. It was picked up for a container without any medium (fill level=0). The second resonance curve 15 was measured for a container with a medium (fill level=$L_F\neq$0). It has an amplitude $A_1$ at the resonant frequency $f_{r,1}$. The resonant frequency $f_{r,1}$ with the fill level is markedly different from the resonant frequency $f_{r,0}$. For the fill level determination according to the invention, the resonant frequency $f_{r,0}$ without a fill level must be known, so that reverse calculation can be done for an arbitary measured resonant frequency $f_{r,1}$ (as explained above). The present level can also be calculated from the ratio of the amplitude $A_0$ to the amplitude $A_1$.

The foregoing relates to preferred exemplary embodiments of the invention, it being understood that other variants and embodiments thereof are possible within the spirit and scope of the invention, the latter being defined by the appended claims.

I claim:

1. A method for determining the level of a medium (4) in a container (5), the method comprising the following steps:
    A) generating a constant magnetic field in the container (5);
    B) exciting an elongated sensor element to produce longitudinal oscillations therein, the sensor element being secured on one end in the container (5) and containing a magnetostrictive material;
    C) measuring the resonant frequency of the sensor element, or the damping of the longitudinal oscillation therein, by periodically varying magnetization of the sensor element in the constant magnetic field; and
    D) determining the fill level from the resonant frequency or from the damping of the longitudinal oscillations.

2. The method of claim 1, wherein the excitation of the sensor element to longitudinal oscillations is effected by an alternating magnetic field.

3. The method of claim 2, wherein the alternating magnetic field is frequency-modulated.

4. The method of claim 1, wherein the excitation of the sensor element to longitudinal oscillations is effected by a magnetic field pulse.

5. A level measuring device for a container (5) that can be filled with a medium (4), the level measuring device comprising:
    an elongated sensor element, which contains or consists of a magnetostrictive material;
    at least one magnet (8) for generating a constant magnetic field;
    at least one magnet (9) for generating a variable magnetic field; and
    at least one measuring device (10) for measuring characteristic variables of a periodically varying magnetic field.

6. The level measuring device of claim 5, wherein the magnetostrictive material is an iron-, cobalt-, or nickel-rich amorphous metal alloy.

7. The level measuring device of claim 5, wherein the elongated sensor element has one end secured in the container (5).

8. The level measuring device of claim 5, wherein the elongated sensor element is disposed in the container (5) perpendicular to the surface (7) of the medium (4).

9. The level measuring device of claim 5, wherein the elongated sensor element is a strip (1) curved in the transverse direction.

10. The level measuring device of claim 5, wherein the magnets and the measuring device are coils (8, 9, 10).

11. The level measuring device of claim 10, wherein the coils (8, 9, 10) are Helmholtz coils or individual coil rings.

12. The level measuring device of claim 5, wherein the at least one magnet for generating the constant magnetic field is a permanent magnet.

13. The level measuring device of claim 5, wherein the magnets and the measuring device are disposed outside the container (5).

14. The level measuring device of claim 5, further comprising a protective tube (12) in the container (5), the protective tube (12) having openings (13) to permit medium (4) in the container to flow into and from the tube (12), and wherein the sensor element is located in the protective tube (12).

15. The level measuring device of claim 14, wherein the at least one magnet for generating the constant magnetic field is a permanent-magnetic strip secured to the protective tube (12).

16. The level measuring device as defined in claim 9, wherein the sensor element is in the form of an elongated tube.

17. A method for determining the level of a liquid in a container (5) in a motor vehicle using a level measuring device for a container (5) that can be filled with a medium (4), the structure being used to perform the method including:

- an elongated sensor element, which contains or consists of a magnetostrictive material;
- at least one magnet (8) for generating a constant magnetic field;
- at least one magnet (9) for generating a variable magnetic field; and
- at least one measuring device (10) for measuring characteristic variables of a periodically varying magnetic field, wherein the method comprises:
- manipulating the elongated sensor element, the at least one magnet for generating a constant magnetic field, and the at least one magnet for generating a variable magnetic field, so as to induce the at least one measuring device to give an indication of the level of the liquid in the container.

* * * * *